US012806896B2

(12) United States Patent
Wiesböck

(10) Patent No.: US 12,806,896 B2
(45) Date of Patent: Nov. 24, 2026

(54) DEVICE FOR DETACHING A TEXTILE FROM A PRINTING PLATE

(71) Applicant: Ludwig Wiesböck, Rohrdorf (DE)

(72) Inventor: Ludwig Wiesböck, Rohrdorf (DE)

( * ) Notice: Subject to any disclaimer, the term of this patent is extended or adjusted under 35 U.S.C. 154(b) by 0 days.

(21) Appl. No.: 18/818,296

(22) Filed: Aug. 28, 2024

(65) Prior Publication Data

US 2025/0074042 A1 Mar. 6, 2025

(30) Foreign Application Priority Data

Aug. 29, 2023 (DE) ..................... 10 2023 123 141.3

(51) Int. Cl.

| | |
|---|---|
| ***B41F 21/04*** | (2006.01) |
| ***B41F 15/14*** | (2006.01) |
| ***B41F 33/00*** | (2006.01) |
| ***B41M 1/12*** | (2006.01) |
| ***B41M 1/14*** | (2006.01) |

(52) U.S. Cl.

CPC .............. *B41F 21/04* (2013.01); *B41F 15/14* (2013.01); *B41F 33/00* (2013.01); *B41M 1/12* (2013.01); *B41M 1/14* (2013.01)

(58) Field of Classification Search

None

See application file for complete search history.

(56) References Cited

U.S. PATENT DOCUMENTS 3,677,538 A * 7/1972 Wall ........................ B41F 15/18 271/900
6,484,629 B1 * 11/2002 Hoffman, Jr ........ B41F 15/0863 101/44
2023/0150276 A1 * 5/2023 Mano ....................... B65H 5/08 101/407.1

FOREIGN PATENT DOCUMENTS

| | | |
|---|---|---|
| CN | 220923554 U | 5/2024 |
| EP | 3521030 B1 | 4/2023 |
| WO | 2022021744 A1 | 2/2022 |

* cited by examiner

*Primary Examiner* — Joshua D Zimmerman
(74) *Attorney, Agent, or Firm* — McCoy Russell LLP

(57) ABSTRACT

The present disclosure discloses a device for detaching a textile from a printing plate, in particular in the case of direct printing and/or screen printing using a plurality of colours, comprising a lifting device which comprises a gripper for gripping a first end of the textile, and a first movement axis for lifting the gripper; and a detachment slider, which can be inserted, via a second movement axis, between the printing plate and the first end of the textile, lifted by the lifting device, in order to detach the textile from the printing plate.

22 Claims, 3 Drawing Sheets

DEVICE FOR DETACHING A TEXTILE FROM A PRINTING PLATE

CROSS REFERENCE TO RELATED APPLICATION

The present application claims priority to German Patent Application No. 10 2023 123 141.3 filed on Aug. 29, 2023. The entire contents of the above-listed application are hereby incorporated by reference for all purposes.

TECHNICAL FIELD

The present disclosure relates to a device for detaching a textile from a printing plate, in particular in the case of direct printing and/or screen printing using a plurality of colours.

BACKGROUND

In the textile industry, in particular in the field of direct printing/screen printing, multicoloured, complex printing designs are often used. In this case, the textile may not slip on the printing plate, between the individual printing stations, since otherwise distortion of the printed image or blurring in the print occurs.

SUMMARY

In order to counteract this, a double-sided adhesive film is applied between the printing plate and the textile. This prevents the textile from slipping during printing but is disadvantageous for the removal of the textile and delivery to the drying tunnel belt. Hitherto, automatic removal is not possible in the case of multicoloured printing. Manual removal is typically uncomfortable and laborious for the operator, on account of the position of the printing plate. Furthermore, it is associated with the risk of damage to the still fresh printing image on account of a non-uniform loading of the textile during detachment.

The object of the present disclosure is therefore that of providing a device for detaching a textile from a printing plate, which replaces the manual detachment practised hitherto.

This object is achieved by a device as described herein.

The present disclosure relates to a device for detaching a textile from a printing plate, comprising a lifting device which comprises a gripper for gripping a first end of the textile, and a first movement axis for lifting the gripper; and a detachment slider, which can be inserted, via a second movement axis, between the printing plate and the first end of the textile, lifted by the lifting device, in order to detach the textile from the printing plate.

In this case, the gripper grips and fixes the textile at the first, optionally lower, end, and "lobs" or lifts this so far that the detachment slider can enter between the textile and the printing plate. In this case, it detaches the textile uniformly from the adhesive film, such that in the next step the textile can be removed manually or automatically.

The device according to the disclosure can be positioned at a suitable position with respect to the printing plate, and thus remedies the poor accessibility existing in the case of the previous manual detachment. Furthermore, the textile is detached uniformly by the detachment slider, such that damage to the printed image is avoided.

The device according to the disclosure can be combined with a device for automatic removal of the textile from the printing plate, and therefore allows such automatic removal even in the case of multicoloured printing, in that it detaches the textile from the adhesive film/printing plate before the removal. After detachment of the textile, the automatic removal and transfer to a drying tunnel can then take place. However, the device according to the disclosure also facilitates the removal of the textile by hand.

The device according to the disclosure can be used in particular in the case of direct printing and/or screen printing and/or in the case of printing using a plurality of colours.

Furthermore, the device according to the disclosure can in particular be used when the textile adheres to the printing plate during printing, and in particular is fixed to the printing plate by at least one adhesive layer, and in particular a double-sided adhesive film.

Furthermore, the device according to the disclosure can be used in particular when printing a textile which is pulled onto the printing plate by a lower opening and thus surrounds said printing plate. The detachment slider is optionally pushed into said lower opening, wherein the first end corresponds to the lower end of the textile.

The device according to the disclosure can be used in particular in the case of printing of t-shirts.

According to a possible embodiment of the present disclosure, the gripper is a mechanical gripper having two clamping elements, between which the first end of the textile can be clamped. In particular, the clamping elements can be clamping bars.

According to a possible embodiment of the present disclosure, the detachment slider comprises a thrust plate which is linearly displaceable via a telescopic rail structure.

According to a possible embodiment of the present disclosure, a front edge of the detachment slider, in particular of the thrust plate, has a chamfer, in order to lift and detach the textile.

According to a possible embodiment of the present disclosure, the device has a size adjustment means by which the position of the lifting device can be adjusted to the position of a first end of the textile. As a result, different textile, which end at different positions on the printing plate, can be printed.

According to a possible embodiment of the present disclosure, the position of the lifting device can be adjusted by the size adjustment means in a direction in parallel with the extension direction of the second movement axis of the detachment slider.

According to a possible embodiment of the present disclosure, the size adjustment means comprises a third movement axis, via which the position of the lifting device can be adjusted in a direction transverse to the direction of the first movement axis. The third movement axis can be adjustable manually and/or by motor.

According to a possible embodiment of the present disclosure, the adjustment of the position of the lifting device takes place relative to an assembly which comprises the bearing of the detachment slider, wherein the position of the bearing of the detachment slider is optionally not adjusted. The adjustment of the movement of the detachment slider to the size of the textile is typically not necessary or can take place by an adjustment of the displacement path of the detachment slider.

According to a possible embodiment of the present disclosure, the position of the lifting device on a carrier arm which carries a bearing of the detachment slider is adjustable by the size adjustment means.

According to a possible embodiment of the present disclosure, the size adjustment means comprises a sensor which acquires the position of the first end of the textile, and a controller which adjusts the position of the lifting device, on the basis of the data of the sensor, to the position of a first end of the textile. In particular, for this purpose the controller operates an actuator of the size adjustment means.

The sensor can in particular be a vision sensor and/or a camera detection means.

According to a possible embodiment of the present disclosure, the size adjustment means allows a manual specification of the position of the lifting device, in particular via a separate input element or a control panel.

According to a possible embodiment of the present disclosure, the size adjustment means comprises a projector for projecting a marking, wherein the marking optionally shows the position at which the first end of the textile must be arranged in order to be gripped in the current setting of the size adjustment means. This allows in particular for easier manual setting of the position.

According to a possible embodiment of the present disclosure, the gripper comprises a gripping actuator, via which it is operated by motor.

According to a possible embodiment of the present disclosure, the first movement axis comprises an actuator, via which it is operated by motor.

According to a possible embodiment of the present disclosure, the second movement axis comprises an actuator, via which it is operated by motor.

According to a possible embodiment of the present disclosure, the third movement axis comprises an actuator, via which it is operated by motor.

The actuators can for example each be an electrical, pneumatic, and/or hydraulic actuator.

According to a possible embodiment of the present disclosure, the device comprises a controller which controls the actuators of the gripper and/or of the first and/or second and/or third movement axis.

According to a possible embodiment of the present disclosure, the control takes place automatically.

According to a possible embodiment of the present disclosure, the control of the actuator(s) takes place in such a way that the device performs the actions and/or method steps described above and in the following.

According to a possible embodiment of the present disclosure, the controller comprises an interface for coupling to the controller of a printing machine and/or of a device for handling printing plates having textiles applied thereto. In particular, the controller of the device according to the disclosure can be controlled by an interface of this kind.

According to a possible embodiment of the present disclosure, the controller is configured such that the device carries out the following method, in particular automatically:

- gripping the first side of the textile using the gripper;
- lifting the first side of the textile by moving the gripper by means of the first movement axis;
- inserting the detachment slider, via a second movement axis, between the printing plate and the first end of the textile, lifted by the lifting device, and detaching the textile from the printing plate.

According to a possible embodiment of the present disclosure, the control furthermore takes place such that a return of the detachment slider takes place, via a second movement axis, following the insertion of the detachment slider and the detachment of the textile.

The device according to the disclosure can be integrated into a device for handing printing plates or a printing machine, in particular as the penultimate station of such a handling device and/or printing machine, and/or after the last printing station and/or before the removal station.

The present disclosure further comprises a device for handling printing plates of a printing machine, which comprises a device for detaching a textile from a printing plate, as has been described above.

According to a possible embodiment of the present disclosure, the device for handling printing plates of a printing machine comprises a movement axis via which a printing plate can be moved into the region of the device for detaching a textile from the printing plate. Furthermore, the printing plate with the detached textile can be movable further, via the movement axis, to a removal station.

According to a possible embodiment of the present disclosure, the printing plate can be moved by the handling device to at least one printing station, and optionally to a plurality of printing stations.

In particular, the printing plate comprising the textile can be moved by the device for handling printing plates to one or more printing stations, and then to a station which is formed by the device for detaching the textile.

The device for handling printing plates can in particular comprise a rotary table having a plurality of holders for printing plates and can transport the printing plates from one station to the next, in a clocked manner.

The present disclosure further comprises a printing machine comprising a device for handling printing plates, and/or comprising a device for detaching a textile, as has been described above.

The printing machine can furthermore comprise a drying station, on which the textiles can be laid after removal from the printing plates.

If, in the context of the disclosure, reference is made to a movement axis, this means a mechanical guide which allows a movement in at least one direction and/or about at least one axis. However, a movement axis can also allow for more complex movements.

In particular, a movement axis according to the present disclosure can have one or more linear axes and/or rotational axes.

In particular, the above-described movement axes of the device according to the disclosure for detaching a textile are each formed by a linear axis.

According to a possible embodiment of the present disclosure, the controller comprises a microprocessor and a non-volatile memory, on which a programme comprising commands is stored, which commands, if executed on the microprocessor, control the device, and in particular control it in such a way that it carries out the activities and/or has the functions described in the context of the present application. Alternatively, the controller can also be implemented in terms of hardware technology or mechanically. The controller is optionally connected to the actuators and optionally sensors via signal lines.

The present disclosure furthermore comprises a method for operating a printing machine as has just been described, comprising the steps of:

- applying a textile to a printing plate, in particular adhesively bonding the textile;
- printing the textile, in particular by direct printing and/or screen printing and/or using a plurality of colours;
- gripping the first side of the textile using the gripper;
- lifting the first side of the textile by moving the gripper by means of the first movement axis;
- inserting the detachment slider, via a second movement axis, between the printing plate and the first end of the textile, lifted by the lifting device, and detaching the textile from the printing plate;

and optionally:

returning the detachment slider via a second movement axis.

According to a possible embodiment of the present disclosure, the operation of the device for detaching a textile takes place automatically.

BRIEF DESCRIPTION OF THE FIGURES

The present disclosure will now be described in greater detail with reference to an embodiment and drawings, in which.

DETAILED DESCRIPTION

Figure 1:
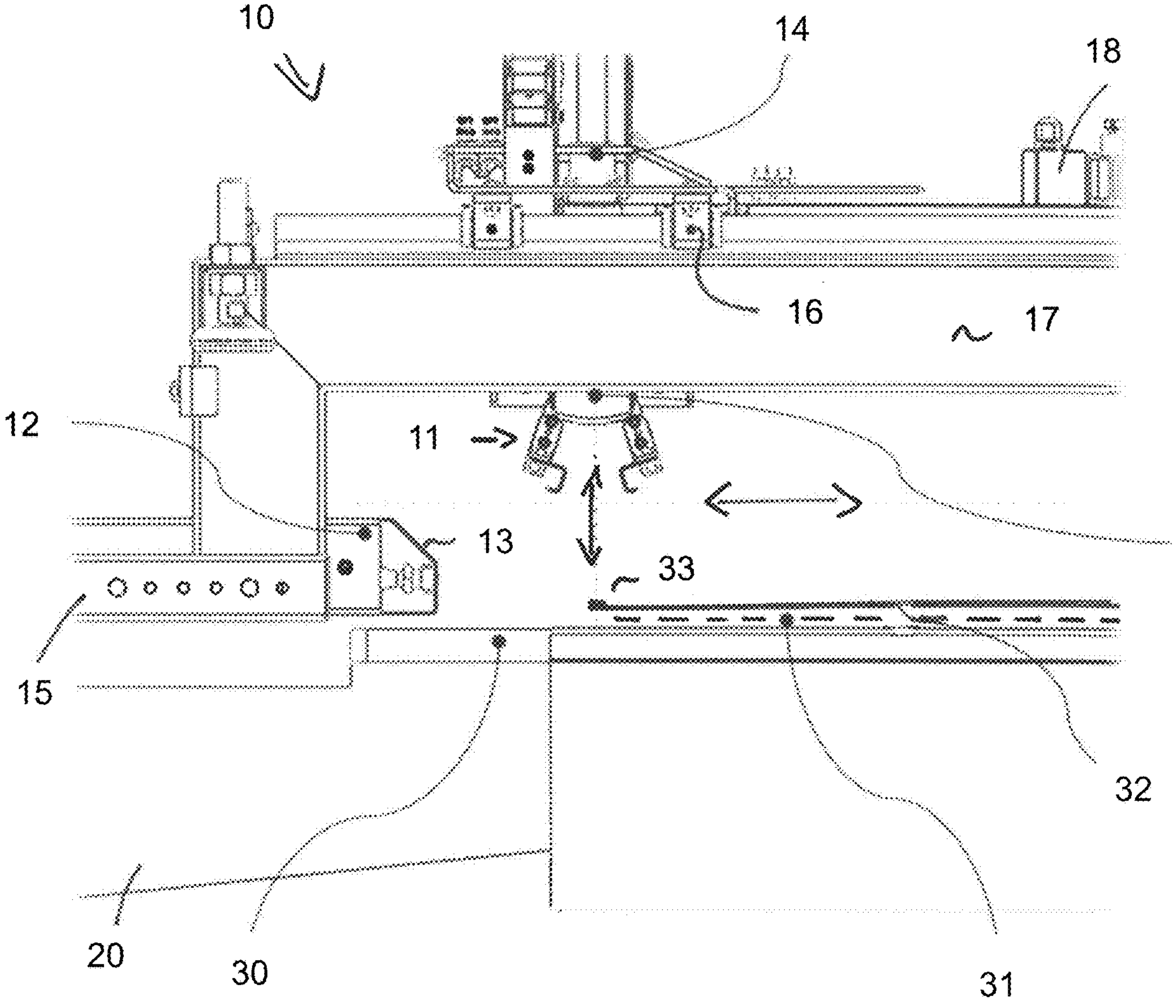
FIG. 1 shows an embodiment of a device according to the disclosure for detaching a textile, in a starting position in which the textile adheres to the printing plate.
Figure 2:
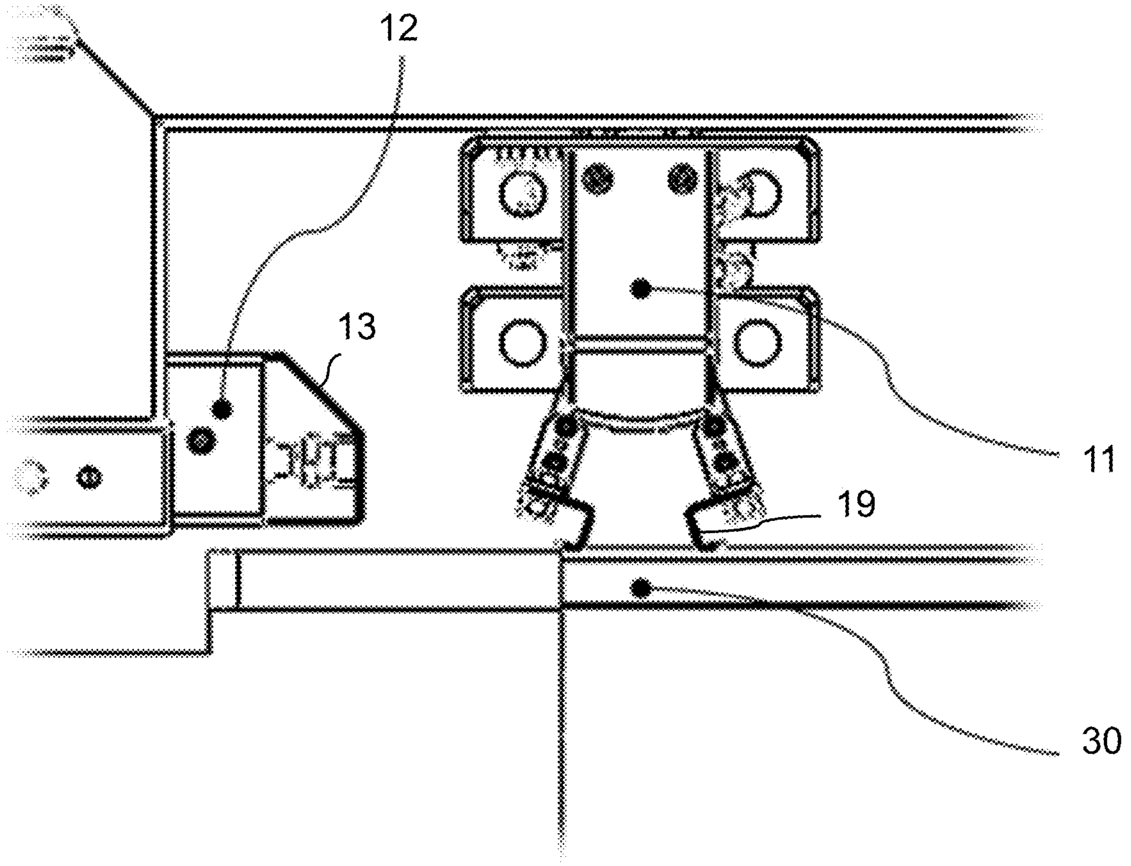
FIG. 2 shows the embodiment shown in FIG. 1 in an intermediate position in which the gripper receives the first end of the textile.
Figure 3:
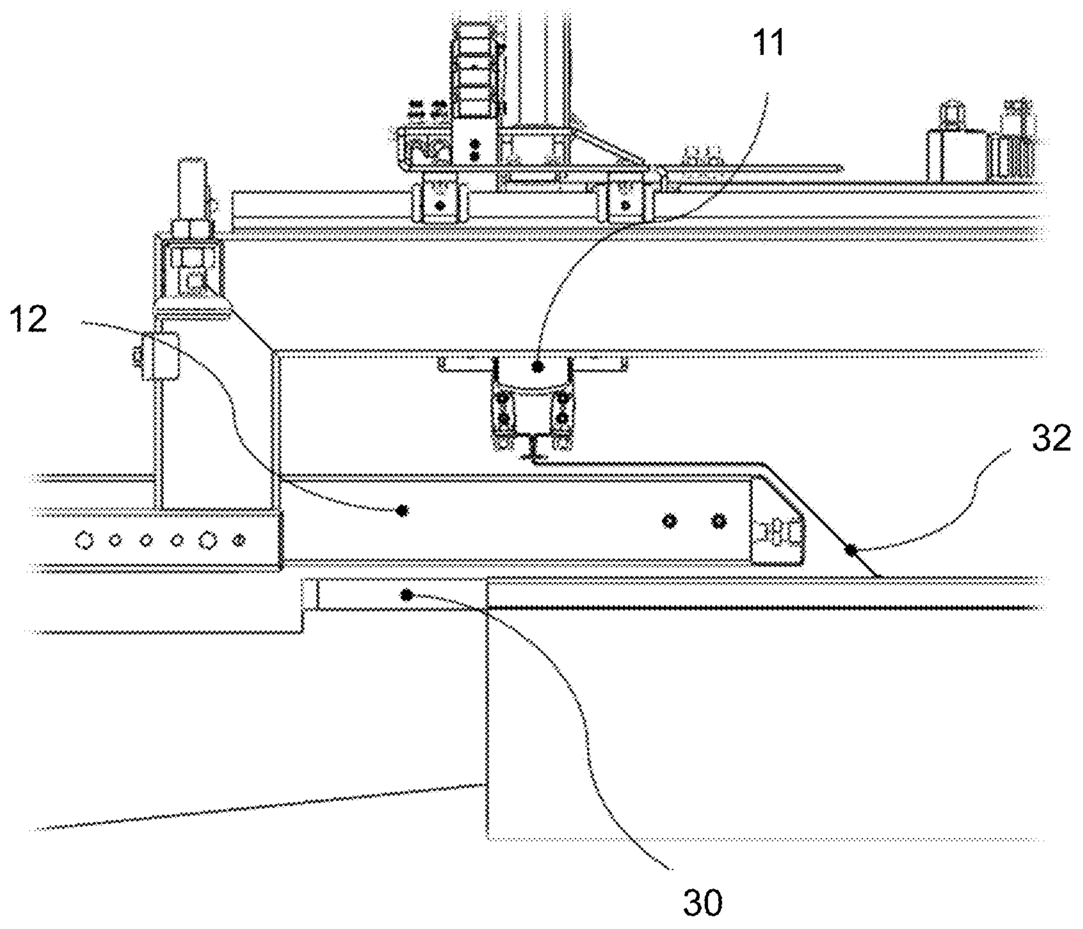
FIG. 3 shows the embodiment shown in FIGS. 1 and 2 in work stroke, in which the detachment slider is inserted between the textile and the printing plate and detaches the textile from the printing plate.

FIGS. 1 to 3 show an embodiment of a device 10 for detaching a textile, which can be integrated into a printing machine, in particular in the field of direct printing/screen printing, for example as the penultimate station prior to removal.

Reference sign 20 shows a part of a device for handling printing plates of the printing machine, by which the printing plates can be moved from one station to the next. For example, it may be a rotary table having a plurality of arms, on which the printing plates are arranged.

In order to create multicoloured, complex printing designs, the textile 32 may not slip on the printing plate 30, between the individual printing stations, since otherwise distortion of the printed image or blurring in the print occurs. In order to counteract this, a double-sided adhesive film 31 is applied between the printing plate 30 and the textile 32. This prevents the textile from slipping during printing.

The device 10 serves to detach the textile 32 from the printing plate 30 after printing. It comprises a lifting device having a gripper 11 and a movement axis 14 for lifting the gripper 11. The gripper 11 grips and fixes the textile 32 at the lower end 33. By lifting the gripper 11, this "lobs"/lifts the lower end 33 of the textile to such an extent that the detachment slider 12 of the device can enter between the textile 32 and the printing plate 30. In this case, it detaches the textile 32 uniformly from the adhesive film 31, such that in the next step the textile can be removed manually or automatically.

The device allows for automatic detachment of the textile from the adhesive film/printing plate, and, as a result, subsequently automatic removal, even in the case of multicoloured printing. However, it can also be combined with manual removal. After the removal of the textile, transfer to a drying tunnel belt can take place.

In the embodiment, the gripper 11 comprises receiving and clamping/fixing of the textile 32 at the lower end 33 (usually on the side facing the printing machine), which is strong enough to withstand the tensile force by the detachment slider 12. Thus, in the embodiment, this is a mechanical gripper comprising two clamping jaws or clamping bars 19, between which the lower end 33 is clamped. In the embodiment, the movement axis 14 lifts the gripper perpendicularly to the extension of the printing plate 30 and/or the movement direction of the detachment slider. It is optionally driven by motor.

The detachment slider 12 comprises a thrust plate on a telescopic rail structure 15 and is inserted between the printing plate 30 and the textile 32, driven by an actuator (of electrical or pneumatic nature). The thrust plate has a chamfered edge 13 at the front, in order to lift and detach the textile, while this is simultaneously held by the gripper 11. When the detachment slider 12 is pushed back, the textile is again deposited on the printing plate 30 comprising the adhesive film 31, with the difference that this time, on account of a lack of pressing force, no adhesion to the adhesive film 31 is established.

Subsequently, the printing plate 30, with the detached textile, is transported via the device 20 to a removal station, in particular by further rotating the device 20.

The operation of the device optionally takes place automatically. For this purpose, a controller (not shown) is provided, which controls the actuators of the device accordingly.

In the embodiment, the device 10 for detaching the textile comprises a (optionally automatic) size adjustment means 16, by which the gripper 10 of the lifting device is oriented to the lower edge 33 of the textile 32 to be printed. The size adjustment means 16 may include a sensor (e.g., vision sensor, camera, or position sensor) which acquires the position of an end of the textile or input means for inputting the position of the end of the textile, and a controller which adjusts the position of the lifting device, on the basis of the data of the sensor or the input means, to the position of a first end of the text. The controller may include a processor and instructions stored in memory for reading the sensor value and adjusting the actuator in response thereto as described herein.

In the case of a t-shirt, for example, the lifting device is displaced depending on the size of the shirt. For this purpose, in the embodiment the lifting device is linearly displaceable along a carrier arm 17, in particular via an actuator 18.

The position value for the adjustment axis can be predetermined either by a vision sensor/camera detection means, or by a value that can be set manually by the operator (for example using a laser line and encoder value, or by means of worker input on the control panel). Therefore, the size adjustment means of the lifting and clamping mechanism is adjusted depending on the size/length of the textile.

Furthermore, the displacement path of the detachment slider can be adjusted to the size of the textile.

The invention claimed is:

1. Printing machine, comprising a printing plate and a device for detaching a textile from the printing plate, the device comprising:

a lifting device which comprises a gripper for gripping a first end of the textile, and a first movement axis for lifting the gripper; and a detachment slider and a second movement axis, wherein the device for detaching the textile from the printing plate is configured such that the detachment slider is inserted, via the second movement axis, between the at least one printing plate and the first end of the textile after the first end has been gripped and lifted by the lifting device, in order to detach the textile from the at least one printing plate with the detachment slider.

2. Printing machine according to claim 1, wherein the gripper is a mechanical gripper having two clamping elements, between which the first end of the textile can be clamped.

3. Printing machine according to claim 1, wherein the detachment slider comprises a thrust plate which is linearly displaceable via a telescopic rail structure.

4. Printing machine according to claim 1, wherein a front edge of the detachment slider comprises a chamfer, in order to lift and detach the textile.

5. Printing machine according to claim 1, the device comprising a size adjustment means by which a position of the lifting device can be adjusted to a position of a first end of the textile.

6. Printing machine according to claim 5, wherein the position of the lifting device on a carrier arm which carries a bearing of the detachment slider is adjustable by the size adjustment means.

7. Printing machine according to claim 5, wherein the size adjustment means comprises a sensor which acquires the position of the first end of the textile, and a controller which adjusts the position of the lifting device, on the basis of data of the sensor, to the position of the first end of the textile.

8. Printing machine according to claim 5, wherein the size adjustment means allows for a manual specification of the position of the lifting device via a separate input element or a control panel, and/or wherein the size adjustment means comprises a projector for projecting a marking, wherein the marking shows a position at which the first end of the textile must be arranged in order to be gripped in the current setting of the size adjustment means.

9. Printing machine according to claim 5, wherein the position of the lifting device is adjustable in a direction in parallel with an extension direction of the second movement axis of the detachment slider.

10. Printing machine according to claim 1, wherein the gripper comprises a gripping actuator, via which it is operated, and/or wherein the first and/or the second movement axis comprise an actuator, via which they are operated.

11. Printing machine according to claim 1, further comprising a controller which controls actuators of the gripper and/or of the first and/or second movement axis automatically, wherein the controller comprises an interface for coupling to the controller of the printing machine and/or of a device for handling printing plates having textiles applied thereto.

12. Printing machine according to claim 11, wherein the controller is configured to carry out the following method:

gripping the first end of the textile using the gripper;

lifting the first end of the textile by moving the gripper by means of the first movement axis;

inserting the detachment slider, via a second movement axis, between the at least one printing plate and a first end of the textile, lifted by the lifting device, and detaching the textile from the at least one printing plate.

13. Printing machine according to claim 1, wherein the printing machine is a screen printing machine using a plurality of colours.

14. Printing machine according to claim 1, further comprising at least one printing station and a device for handling the at least one printing plate of the printing machine, wherein the device for handling the at least one printing plate comprises a movement axis via which the at least one printing plate can be moved into a region of the device for detaching a textile from the printing plate, wherein the at least one printing plate can be moved by the device for handling to the at least one printing station.

15. Printing machine according to claim 1, wherein the printing machine is configured such that movement of the detachment slider via the second movement axis completely detaches the textile from an adhesive film provided on the at least one printing plate.

16. Printing machine according to claim 1, wherein the textile is a T-shirt having a lower opening at the first end, wherein the printing machine is configured for printing the textile with the textile pulled onto the printing plate by the lower opening and thus surrounding said printing plate, the detachment slider being configured to be pushed into said lower opening.

17. Method for operating a printing machine according to claim 1, comprising the steps of:

applying a textile to the at least one printing plate;

printing the textile using the printing machine;

gripping the first end of the textile using the gripper;

lifting the first end of the textile by moving the gripper by means of the first movement axis;

inserting the detachment slider, via the second movement axis, between the at least one printing plate and the first end of the textile after the first end has been gripped and lifted by the lifting device, and detaching the textile from the at least one printing plate with the detachment slider.

18. Method of claim 17, wherein the printing is by screen printing and/or using a plurality of colours.

19. Method according to claim 17, wherein the operation of the device for detaching a textile takes place automatically.

20. Method according to claim 17, further comprising:

returning the detachment slider via the second movement axis.

21. Method according to claim 17, wherein the detachment slider is moved via the second movement axis such that it completely detaches the textile from an adhesive film provided on the at least one printing plate.

22. Method according to claim 17, wherein the textile is a T-shirt having a lower opening at the first end, wherein the textile is pulled onto the printing plate by the lower opening and thus surrounds said printing plate during printing, and wherein the detachment slider is pushed into said lower opening.

* * * * *